United States Patent [19]

Cushing

[11] Patent Number: 4,458,542

[45] Date of Patent: Jul. 10, 1984

[54] ELECTROMAGNETIC FLOW METER WITH WIDE BAND PREAMPLIFIER

[76] Inventor: Vincent Cushing, 265 Loyola Dr., Millbrae, Calif. 94030

[21] Appl. No.: 318,903

[22] Filed: Nov. 6, 1981

[51] Int. Cl.³ .................................................. G01F 1/60
[52] U.S. Cl. .................................................. 73/861.17
[58] Field of Search ............ 73/861.12, 861.16, 861.17

[56] References Cited

U.S. PATENT DOCUMENTS

| | | | |
|---|---|---|---|
| 3,603,146 | 9/1971 | Bennett et al. | 73/861.16 |
| 3,759,097 | 9/1973 | Cushing | 73/861.17 X |
| 3,802,263 | 4/1974 | Krechmery et al. | 73/861.16 |
| 3,839,912 | 10/1974 | Schmoock et al. | 73/861.12 |
| 3,955,413 | 5/1976 | Steele et al. | 73/861.17 |
| 4,306,191 | 12/1981 | Bader. | |

Primary Examiner—Charles A. Ruehl
Attorney, Agent, or Firm—Pollock, Vande Sande & Priddy

[57] ABSTRACT

An electromagnetic flow meter includes a preamplifier with extremely long time constant to achieve wide band operation. To alleviate undesirably long recovery from transients and the like, an effective dc bias is obtained by periodically resetting the bias levels. The invention is applicable outside the field of electromagnetic flow meters.

8 Claims, 6 Drawing Figures

ELECTROMAGNETIC FLOW METER WITH WIDE BAND PREAMPLIFIER

DESCRIPTION

Technical Field

The invention relates to electromagnetic flow meters, and more particularly to a preamplifier designed to process signals produced by the electrodes of an electromagnetic flow meter.

Background Art

The electromagnetic flow meter includes a magnetic field source which is arranged to subject a flowing fluid field to a predetermined magnetic field. At least a pair of electrodes are also supported in the flowing fluid field which is subjected to the magnetic field, and voltages are induced into the electrodes which are related, at least in part, to the fluid velocity. Associated apparatus is designed to process the signal induced on the electrodes so as to discriminately amplify the flow related voltages at the expense of other spuriously induced voltages. Some flow meters have conductive or galvanic relationship with the metered fluid. Others are capacitively coupled to the metered fluid. The latter type of flow meters, sometimes called electrodeless, actually also have electrodes. For purposes of this application any device or element that conveys the flow induced voltage to signal processing elements is considered to be or include an electrode regardless of the mechanism (conductive, galvanic or capacitive) employed.

The burden placed on the electronics is indeed significant because the flow related voltage is measured in microvolts whereas typically the voltage required to produce the magnetic field for example can be measured in tens of volts. Thus the associated electronics has to deal with a number of noise sources. A first noise source is derived from unwanted coupling between the magnetic field source and the sensing electrodes and its associated electronics. A second noise source is derived from power line induced voltages.

The prior art has dealt with these same problems; a common technique for reducing the contribution of these noise sources is common mode rejection, i.e. a differential amplifier is used in the signal processing chain to amplify the difference in the voltages induced in two sensing electrodes. This is particularly effective for diffuse sources such as power line noise. Another useful technique for rejecting power line signals is described in my prior U.S. Pat. No. 3,855,858 entitled "Self-Synchronous Noise Rejection Circuit for Fluid Velocity Meter".

The other type of noise contribution, derived from the magnetic field source itself is termed "transformer effect", because it is induced in the electronics wiring via magnetic induction. A substantial reduction in this transformer effect voltage is obtained, as described in my prior U.S. Pat. No. Re. 28,989 by arranging the magnetic field to switch between two levels, i.e. alternate. Since, as is known to those skilled in the art, a voltage induced via magnetic coupling is related to the time derivative of magnetic flux, the "transformer effect" voltage induced as a result of an alternating magnetic field, is at a maximum just after the change in magnetic field and dies out as a function of time.

Accordingly, as described in my U.S. Pat. No. Re. 28,989, a sampling technique is employed to sample the electrode generated voltage, and the sampling incident is chosen as long after the alternation in magnetic flux, as is possible, i.e. just before the next alternation.

However, parasitic effects in the electronics have, in the past, been a limiting factor in reducing this "transformer effect" voltage or noise. Furthermore, the very techniques used to minimize transformer effect coupling have introduced other, undesirable characteristics into the equipment. For example, a preamplifier is typically capacitively coupled between electrodes and the differential amplifier. The main function of the preamplifier is impedance transformation, i.e. change the megohm (or higher) level of the electrode signal to something more reasonable for coupling to the differential amplifier. While prior art workers have used preamps with time constants of one or a few seconds, I prefer to use time constants of much longer duration, e.g. many hundreds of seconds, a thousand seconds or even more. This is advantageous in minimizing the effects of the "transformer effect". The use of square wave magnetic field waveforms and sampled sensing is predicated on the rapid decay of spurious signals. However, the shorter time constant preamps introduce a phase shift which can undercut the flow meter's noise handling technique. While the spurious voltages do decay rapidly the phase shift can skew the noise timing so that more noise is present at the sampling time than would otherwise be expected. This affects the flow meter's signal vs. flow velocity characteristic. By using long time constants the preamp takes on wide band characteristics and eliminates (or significantly reduces) the unwanted phase shifting. The term wide band must be interpreted relative to the predominant frequency. In the case of electromagnetic flow meters the predominant frequency is dictated by the magnetic field switching which may be in the range of 3-10 Hz.

However, this very same technique, i.e. the relatively long time constant has an undesirable side effect in that any relatively large voltage pulse or spike (which can be produced as a result of a number of different natural effects) pushes the amplifier into saturation, and the long time constant means that the amplifier remains in saturation for that very same long time. For example, a wide band amplifier with time constant on the order of 1000 seconds will, once saturated, remain in saturation for a time on the order of the same 1000 seconds. During that period of time the amplifier, as well as all of the remaining apparatus, is effectively disabled.

It is therefore an object of the present invention to provide an electromagnetic flow meter which is not subjected to the disadvantages of long time constants, notwithstanding the fact that it includes a wide band preamplifier, wherein the wide band characteristic is obtained by using elements with a relatively long time constant. It is another object of the present invention to provide an electromagnetic flow meter in which transformer effect coupling is minimized without paying the price of subjecting the instrument to long periods in saturation in response to a spurious noise pulse. Another object of the invention is to provide a wide band amplifier for use with periodic or simulated periodic signals which reduces the disadvantages of other wide band amplifiers, i.e. saturation and long recovery times. The manner in which the and other objects of the invention are met is described hereinafter.

Summary of the Invention

In accordance with one aspect of the invention a preamplifier is provided, coupled between the sensing electrodes of an electromagnetic flow meter, and a sampling switch, which is timed in relation to alternations of the magnetic field, which preamplifier is of the wide band variety but which includes a switching means to stabilize the operating point of the preamplifier to prevent the preamplifier from remaining saturated for inordinately long periods of time in response to excessive voltages. In accordance with this aspect, the invention thus provides:

an electromagnetic flow meter comprising:
a clock,
a varying magnetic field means driven by said clock to produce a varying magnetic field,
a pair of electrodes and means to support said electrodes in a fluid flow field subject to a magnetic field produced by said magnetic field means,
wide band amplifier means, with a pair of outputs, coupled to said electrodes for changing impedance levels of signals derived from said electrodes,
said wide band amplifier means including switching means driven in synchronism with said clock to stabilize a bias level of said wide band amplifier means,
combining means to combine signals from said pair of outputs, and
sampling switch means coupled to an output of said combining means and driven in synchronism with said clock to sample an output of said combining means in timed relation to operation of said switching means.

In accordance with another aspect, the invention provides a switched wide band amplifier which includes a high impedance input stage such as, for example, an FET or vacuum tube, and a regulator stage for minimizing loading on the input stage; this is achieved by AC bootstrapping together nodes of said input stage. To stabilize the bias level of the input stage, at least one terminal in the regulator stage is, at times, switched to a selected potential level. Since the switched terminal is electrically coupled to the input stage, this ensures that a bias level of the input stage is controlled to prevent the input stage from saturating. Thus, in accordance with another aspect, the invention provides:

a signal source of a varying signal with a period P,
a high impedance active device with a control node coupled to said signal source and two other nodes,
AC bootstrapping means coupling said nodes together, and
switching means in said AC bootstrapping means for stabilizing a DC bias of said active device by driving at least one of said nodes to a fixed potential at a rate fixed with respect to said period P.

Brief Description of the Drawings

The present invention will now be further described in the following portions of the specification, when taken in conjunction with the attached drawings, to enable those skilled in the art to make and use the same. In the drawings, like reference characters identify identical apparatus

Description of Preferred Embodiments

Figure 1:
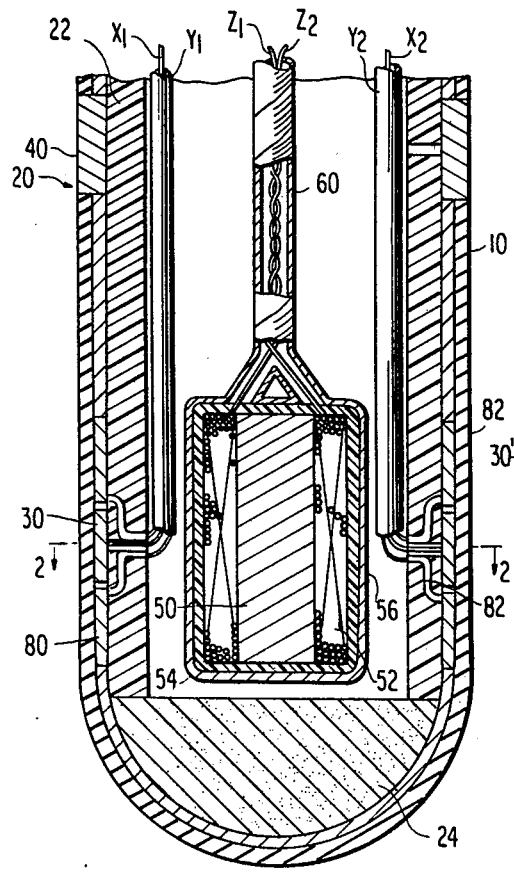
FIGS. 1–3 illustrate respectively, longitudinal and cross-section and a developed view of a probe type electromagnetic flow meter in which the invention finds application.
Figure 2:
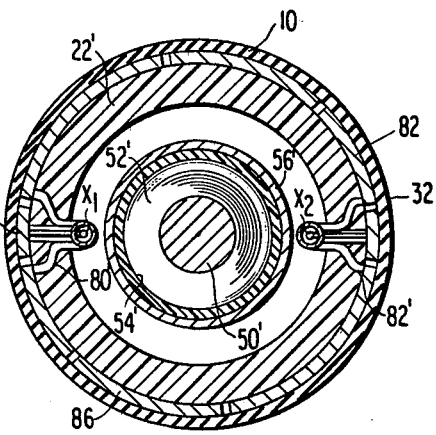
Figure 3:
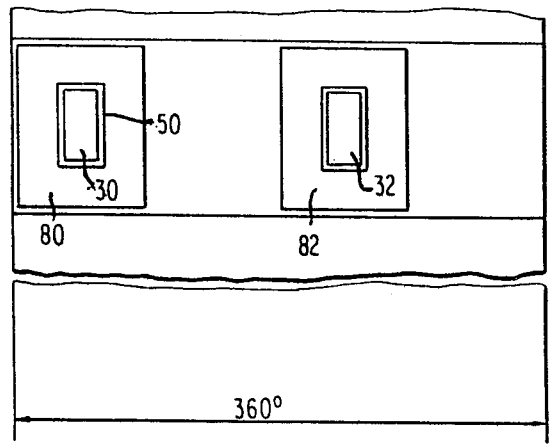

FIGS. 1, 2 and 3 illustrate respectively a typical longitudinal section, cross section, and developed view of the probe portion of an electromagnetic flow meter of the probe type with capacitively coupled sensing electrodes. Although in this application the invention will be illustrated as applied to a probe type flow meter which is arranged to be inserted in a flow field to sense fluid velocity, those skilled in the art will be aware, after reviewing this description, that the invention can be applied to spool type flow meters as well (in which the flow meter surrounds a flow defining conduit).

FIG. 1 is a longitudinal section of the transducer portion 20 of the probe type electromagnetic flow meter. A housing or sleeve 22, which for example can be fiberglass is closed off at one end by an end cap 24. Interior of the sleeve 22 is an electromagnet having a core 50 and a winding 52. Leads Z1 and Z2 are connected to the terminations of the winding 52. The winding 52 is potted and thus a body 54 of insulating material surrounds the winding. A thin layer 56 of electrically conductive material such as a silver paint is provided on the outer surface of the insulation 54 to serve as a shield to shield the electromagnet from the detecting electrodes, described below. The power leads Z1 and Z2 are a shielded twisted pair including a cylindrical shield 60 of electrically conducting material. The shield 60 is fared into the shield 56 to thoroughly shield the electrodes and associated electronics.

For the electromagnetic flow meter shown in FIG. 1, an outer sheath 10 of dielectric material completely surrounds the probe. Interior of the sheath 10 are a pair of detecting electrodes 30 and 32, disposed opposite each other. Accordingly, the sensing electrodes are capacitively coupled to the signal source. Flow meters of this type are sometimes referred to as electrodeless. Each of the electrodes 30 and 32 is surrounded by an associated guard electrode, 80 and 82, respectively. Each sensing electrode and its associated guard electrode are connected respectively to a conductor, for example sensing electrode 30 is connected to a conductor X1 and the associated guard electrode 80 is connected to a conductor Y1; similar remarks apply to the sensing electrode 32 and its associated guard electrode 82, connected to conductors X2 and Y2, respectively. Each of these pairs of conductors actually comprises a shielded pair wherein the Y conductor comprises the shield for the associated X conductor.

FIG. 2 is a cross section of the electromagnetic flow meter taken through the line 2—2 in FIG. 1. FIG. 3 is a developed view of the shell 22 interior of the sheath 10. For the configuration shown, the flow meter includes only a pair of sensing electrodes; however, as described in my U.S. Pat. No. Re. 28,989, two pairs of sensing electrodes may be provided, each 90° apart. Referring briefly to FIG. 3, note that the guard electrodes, 80 and 82, are separated from the associated sensing electrodes, 30 and 32, by an insulating region 50. The angular distance between the center lines of the two sensing electrodes can be 180°, although that is not required; see my copending application entitled "Skewed Electrodes" filed simultaneously herewith. Furthermore, as described in my cited reissue patent, the flow meter can be produced without the sheath 10.

Power for producing the described electromagnetic field is coupled over the conductors Z1 and Z2, and the signal conditioning electronics is connected to the conductors X1–Y1 and X2–Y2.

Figure 4A:
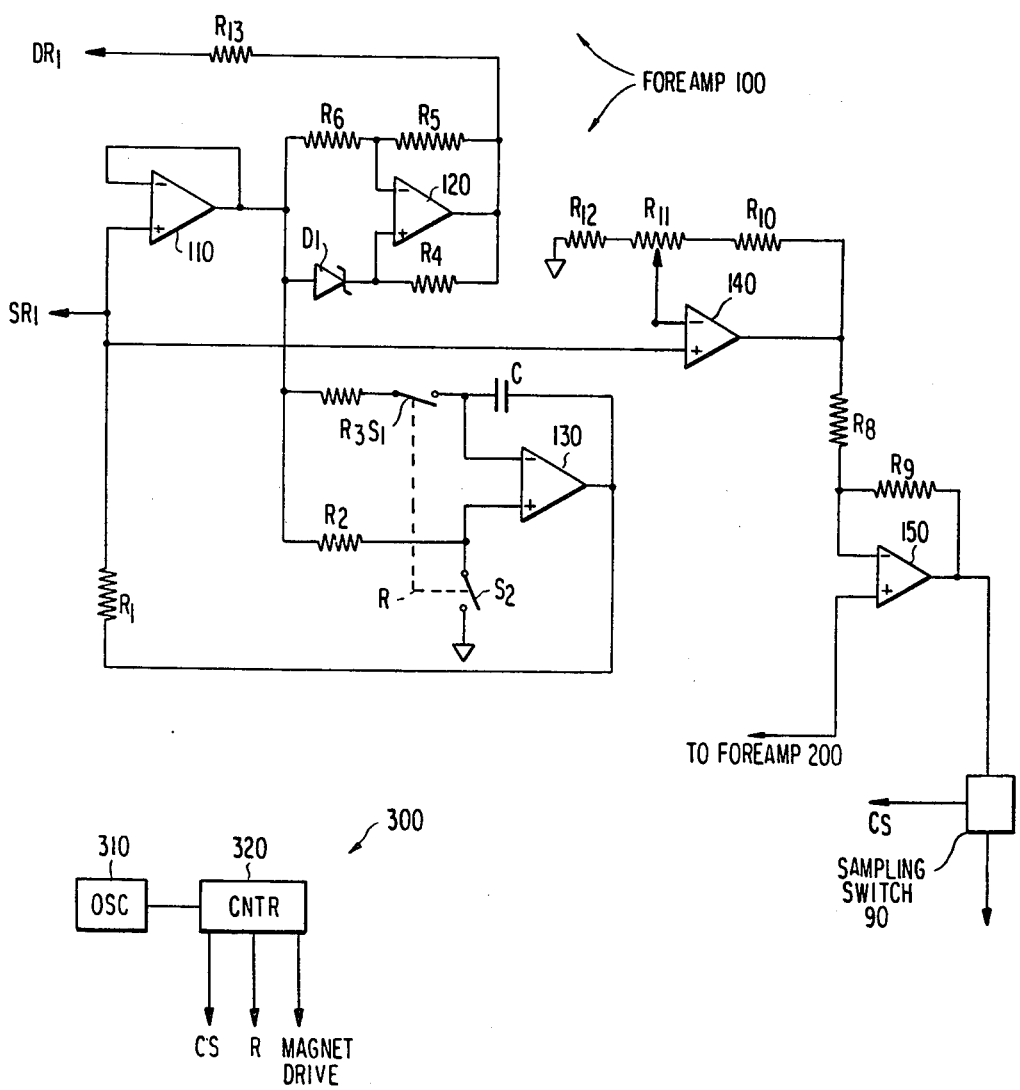
FIG. 4A is a schematic and block diagram of a preferred embodiment of the invention applied to the electromagnetic flow meter of FIGS. 1–3.
Figure 4B:
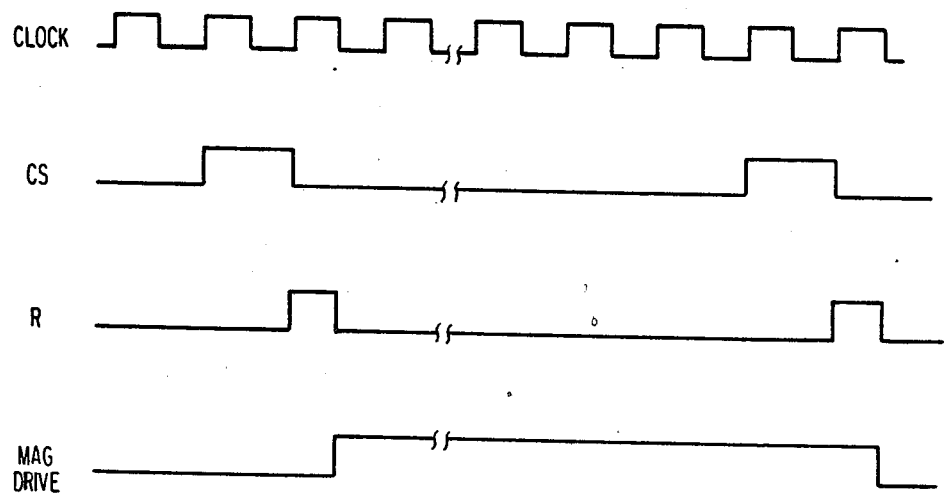
FIG. 4B is a timing diagram illustrating the temporal sequence of selected signals in the circuit of FIG. 4A.

FIGS. 4A and 4B are respectively a schematic of a preferred embodiment of the preamplifier and an associated timing diagram.

Referring first to FIG. 4A, the preamplifier includes a fore amplifier 100, associated with one sensing electrode, a fore amplifier 200, associated with the other sensing electrode, and a differential amplifier comprising operational amplifier 140 and 150. The differential amplifier (140-150) has inputs coupled to the outputs of the fore amplifiers 100 and 200, and an output coupled to other processing circuitry. FIG. 4A illustrates a schematic of a preferred embodiment of the fore amplifier 100, fore amplifier 200 is not illustrated inasmuch as it is substantially identical to fore amplifier 100.

As shown in FIG. 4A, the sensing electrode and guard electrode leads X1 and Y1, respectively, are coupled to the gate and source of an FET Q1, respectively. Coupled in parallel is a gate leak resistor $R_g$. In addition to the lumped elements, a series capacitance $C_o$ represents the capacitance between the sensing electrode and the fluid being monitored, and a gate leak capacitance $C_g$ represents the capacitance between sensing and guard electrodes. In the "electrodeless" configuration of FIGS. 1–3 one embodiment actually constructed had $C_o$ of about 100 picofarads and $C_g$ was on the order of a few hundred picofarads. With an $R_g$ of 10 terohms the time constant, $R_g C_o$ is $10^3$ seconds. It should be apparent to those skilled in the art that we use FET as a generic which accomplishes a function. The FET Q1 functions as an impedance changing element, changing the relatively high impedance signal at its input, to a low impedance signal at its output. Those skilled in the art will be aware that other active devices exhibiting this impedance changing characteristic can also be used, one such device is a vacuum tube in which plate, cathode and grid correspond respectively to drain, source and gate. The FET Q1 should be as close as possible to the transducer's electrode and guard, and best incorporated in the transducer.

In practical implementations, the FET Q1 can be separated from the rest of foreamp 100 by up to several hundred feet. The connecting transmission line (connecting $DR_1$ and $SR_1$) may represent a sizable capacitance to ground.

Amplifier 120 must drive this load. In addition, to prevent ringing the damping resistor R13 is used.

As shown in FIG. 4A, the drain of FET Q1 is labelled $DR_1$, and the source is labelled $SR_1$. FIG. 4A illustrates the apparatus connected to those terminals. More particularly, $DR_1$ is connected via resistor $R_{13}$ (usually needed for stability if the cable is long between Q1 and the remainder of the foreamp) to the output terminal of an operational amplifier 120. That same output terminal is coupled through a resistor $R_5$ to the inverting input. The non-inverting input is coupled through a resistor R4 to the output. A voltage regulating diode $D_1$ has a cathode coupled to the non-inverting input of operational amplifier 120, and an anode coupled to a resistor R6, whose other terminal is coupled to the inverting input.

Those skilled in the art will recognize a conventional DC voltage stabilizer or regulator but our regulator is driven by connecting the anode of diode D1 to the output of an operational amplifier 110 which is directly coupled to its inverting input, the non-inverting input is coupled to the terminal $SR_1$. A resistor R1 (the source resistance of FET $Q_1$) is connected to the terminal $SR_1$, and the other terminal of the resistor—the source resistor node—is connected to the output of an operational amplifier 130. The output of operational amplifier 130 is coupled via a capacitor C to its inverting input and one terminal of a switch $S_1$. The other terminal of the switch $S_1$ is connected via a resistor $R_3$ to the anode of diode D1 and through a resistor $R_2$ to the non-inverting input of operational amplifier 130. The non-inverting input is also coupled to one terminal of a switch $S_2$, whose other terminal is grounded.

Switches $S_1$ and $S_2$ are controlled via a switching signal R, the development of which is discussed hereinafter. At this point, it is sufficient to note that the switches $S_1$ and $S_2$ are operated in synchronism with each other. When closed switch $S_2$ grounds the non-inverting input of operational amplifier 130 and switch $S_1$ connects the inverting input of the operational amplifier 130 through resistor $R_3$ to the anode of diode $D_1$ and the output of voltage follower 110.

The terminal $SR_1$ is also coupled to the non-inverting input of operational amplifier 140 (which is one input of the differential amplifier 140/150; the second input is the non-inverting input to operational amplifier 150). To provide adjustment of differential balance, the inverting input of amplifier 150 is coupled to a potential divider comprising resistors R10–R12 between ground and the output of the operational amplifier 140 and the inverting input of operational amplifier 150 as well as R9.

For differential action, the output of operational amplifier 140 is connected through a resistor R8 to the inverting input of operational amplifier 150. The output of operational amplifier 150 is connected via resistor R9 to the inverting input of operational amplifier 150. The non-inverting input of operational amplifier 150 is coupled to the output of the unillustrated fore amplifier 200. Finally, the output of the differential amplifier 140/150 is coupled to the input of a sampling switch 90 under the control of a control signal CS, the development of which is discussed hereinafter.

The fore amplifier 200 is identical to fore amplifier 100; its output is connected to the second input of the differential amplifier 140/150, i.e., connected to the non-inverting input of operational amplifier 150.

The preamplifier (shown as a single operational amplifier in U.S. Pat. No. Re. 28,989) in accordance with the present invention comprises fore amplifier 100 (for one channel or one sense electrode), a fore amplifier 200 (for the other sense electrode), each coupled to the differential operational amplifier 140/150. Each of the fore amplifiers includes an input FET stage to achieve an impedance changing function. The operational amplifiers 110, 120 and 130 in fore amplifier 100 (and the corresponding amplifiers in fore amplifier 200) ensure that the overall preamplifier exhibits an exceedingly long time constant yet is capable of being synchronously reset to its correct electrical operating point, and thus can be turned on and recover from transients without a long delay. Before discussing the operation of the fore amplifier reference is made to the timing diagram of FIG. 4B. FIG. 4B shows four relevant waveforms.

An upper clocking waveform (clock) of FIG. 4B which for example can comprise the output of an oscillator 310. The second line of FIG. 4B, labelled CS, is the sampling strobe or control signal which controls the sampling switch 90. The last line in FIG. 4B comprises the drive for the electromagnet 52. The period of the clock is arranged such that each polarity of the magnet drive occupies an equal and whole number of clock cycles. The magnet drive is periodic in that it is of one polarity for a first duration and rapidly switches to another polarity for an equal duration. The sampling switch is closed (indicated by the pulse in the waveform CS) just prior to the change in magnet drive polarity and accordingly the sense electrode is sampled as long after the alternation in magnetic polarity, as is possible. The control signal R is located between the termination of the sampling operation and the change in magnetic polarity, that is the switches $S_1$ and $S_2$ are closed during the period of time the waveform R is high, and the switches are open at other times. Thus, as shown in FIG. 4B, the falling edge of CS is coincident with the rising edge of R and the falling edge of R is coincident with the change in magnetic polarity. As a precaution the timing strobes may be modified such that the "coincidences" are separated by several microseconds to guarantee: (1) sampling switch 90 is fully opened before transient owing to reset R commences; and, (2) magnet drive does not change until the reset transient in the fore amplifier has died away. With the switches $S_1$ and $S_2$ in an open condition the non-inverting input of amplifier 130 is coupled via resistor R2 to the output of operational amplifier 110 which performs a unity gain buffering function. As a result the non-inverting input to operational amplifier 130 faithfully follows the potential on $SR_1$, the source of FET Q1. Since FET Q1 is coupled as a source follower, this terminal follows the gate potential or the potential on the sensing electrode.

On the other hand, when the switches $S_1$ and $S_2$ are closed, the same non-inverting input terminal of operational amplifier 130 is connected to ground. Accordingly, operational amplifier 130 then performs as an inverting integrator with a time constant of $R_3C$. As a result, its output (coupled to $SR_1$ via resistor R1) will reach equilibrium when the output of operational amplifier 110 has been reduced to ground potential. In other words, equilibrium is reached when the output voltage of amplifier 130 has been driven to that voltage which is required to place the source of FET Q1 at electrical ground voltage. Accordingly, at the conclusion of the pulse R the FET is driven to an operating point such that, after completion of each flow signal (coincident with the pulse CS) the source of FET Q1 is reset to ground. This ensures that the FET is not bootstrapped into saturation, and means that if saturated, the period of this saturating interval will terminate rapidly, usually with the next pulse R.

Following the reset strobe R, the magnet alternation takes place and note that this occurs when the switches $S_1$ and $S_2$ are open. As a result, Q1's drain and its source resistor R1 are fully bootstrapped and the sensing electrode is fully guarded; therefore, fore amplifier 100 faithfully follows changes in the flow voltage, even through the high impedance of the coupling capacitor $C_o$. By reason of the switching action of switches $S_1$ and $S_2$, the pertinent time constant for the fore amplifier 100 is infinite (corresponding to the infinite resistance seen at the open switches).

In the preferred embodiment shown in FIGS. 4A and 4B the duration of the pulse R is about 15-20 milliseconds. In this embodiment the pulse R is produced twice for each magnet cycle (or sampling cycle). Since any perturbation of the sense signal caused by this double frequency switching is symmetric, it should be rejected by the sampling system. Under these conditions the R pulse duration can be significantly shorter, e.g. 1-3 milliseconds or even less. While the pulse duration R can be lengthened beyond 15-20 milliseconds, there is no advantage. Furthermore, while in the preferred embodiment the R pulse is produced twice per cycle, that rate can be reduced so long as it remains symmetric. In other words, it can be produced twice per two cycles, twice per four cycles, etc. Those skilled in the art will understand how the R pulse of FIG. 4B is generated by dividing the output of oscillator 310 and how other R pulse timing, as recited above, can be effected by appropriate dividing and counting. Accordingly, no further description of counter 320 is necessary.

Although the amplifier 140/150 has been described as a differential amplifier, it should by now be apparent that the differential function is not essential to the invention. In that regard, the amplifier 140/150 can be regarded as effecting a combining function, combining the input signals derived from the sensing electrodes and producing an output representing a combination of the inputs.

Figure 5:
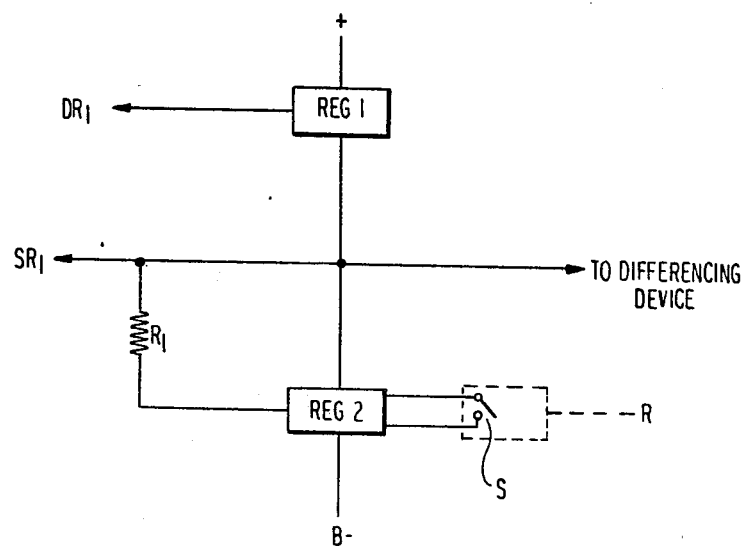
FIG. 5 is a block diagram of the invention.

FIG. 5 is a block diagram of the invention. As shown in FIG. 5 the terminal $DR_1$ is connected to the output of a voltage regulator REG1 with inputs connected to + and $SR_1$, respectively. A second regulator, REG2, has an output terminal connected to $R_1$, and input terminals connected to $SR_1$ and B−, respectively. Since the regulators REG1 and REG2 faithfully output changes across their inputs, the terminals $DR_1$ and $SR_1$ are AC bootstrapped. A switch S is controlled to close by the reset pulse R to establish a bias point for the active device connected to $DR_1$ and $SR_1$. Comparing FIGS. 4A and 5 note that operational amplifier 110 is a unity gain buffer (preferably gain of 1.000 or better) so that REG1 corresponds to operational amplifier 120 and D1 and REG2 corresponds to operational amplifier 130, switches $S_1$ and $S_2$ in FIG. 4A correspond, in FIG. 5A to switch S. The advantages of the invention are not restricted to the field of electromagnetic flow meters but can be applied wherever a high impedance signal must be faithfully followed via a wideband preamplifier exhibiting rapid turn on and recovery from transients. The periodicity of the input signal is necessary so that the perturbations caused by the reset can be rejected. The flow meter signal is periodic since the driving field is periodic, however in other applications the periodicity requirement can be artificially introduced as is well known to those skilled in the art.

While FIGS. 4A and 5 show the switches $S_1$, $S_2$ and S as mechanical, those skilled in the art will realize that electronic analog switches could be used so long as the transition from open to closed (and vice versa) is suitably short and the impedance ratio between open and closed conditions is suitably high.

The electromagnetic flow meter field is particularly demanding of the electronics in that the source impedance can vary over a wide range. The source impedance varies with the conductivity of the metered fluid. Typical fluids and their conductivities are: sea water 4 mhos/m; alcohol $10^{-3}$ mhos/m; hydrocarbon $10^{-13}$ mhos/m. In other less demanding applications the high impedance input device, the FET described as exemplary, could be replaced by bipolar transistors.

I claim:

1. An electromagnetic flow meter comprising:

a clock producing a cyclic output, magnetic field means driven by said clock to produce a magnetic field of cyclic form divided into two magnet half cycles, a transducer including a pair of electrodes and means to support said electrodes in a fluid flow field subject to a magnetic field produced by said magnetic field means, wide band amplifier means, with a pair of outputs, coupled to said electrodes for changing impedance levels of signals derived from said electrodes, said wide band amplifier means having a bias control including switching means driven in synchronism with said clock to stabilize a bias level of said wide band amplifier means to thereby limit a period of saturation in said wide band amplifier means, combining means to combine signals from said pair of outputs, and sampling switch means coupled to an output of said combining means an driven in synchronism with said clock to sample an output of said combining means in timed relation to operation of said switching means.

2. The apparatus of claim 1 wherein, during each magnet half cycle, said sampling switch means effects a sampling operation prior to operation of said switching means and said switching means resets a voltage at a terminal in said wide band amplifier means.

3. The apparatus of claim 1 wherein said wide band amplifier means includes a FET source follower with a gate terminal coupled to one of said pair of electrodes, a voltage regulator coupled to said FET, said voltage regulator including said switching means for at times resetting a voltage at a terminal in said voltage regulator.

4. The apparatus of claim 3 wherein said FET is housed in said transducer.

5. The apparatus of claim 1 wherein said pair of electrodes each includes a sensing electrode and a guard electrode, said wide band amplifier means includes a pair of wide band amplifiers, one for each of said sensing electrodes, each said pair of wide band amplifiers coupled between a sensing electrode and a guard electrode.

6. The apparatus of claim 5 wherein each of said pair of wide band amplifiers includes an FET input stage.

7. The apparatus of claim 6 wherein said FET input stage includes a source resistor node which is biased by an output of one of said pair of wide band amplifiers.

8. The apparatus of any of claims 1–7 wherein said combining means comprises a differential amplifier with a pair of inputs, each connected to a different one of said wide band amplifier means outputs.

* * * * *